Feb. 14, 1956 E. T. HEALD 2,734,942
MAGNETIC COMMUTATOR
Filed Sept. 26, 1952 3 Sheets-Sheet 1

INVENTOR.
EARL T. HEALD
BY
Marin Moody
ATTORNEY

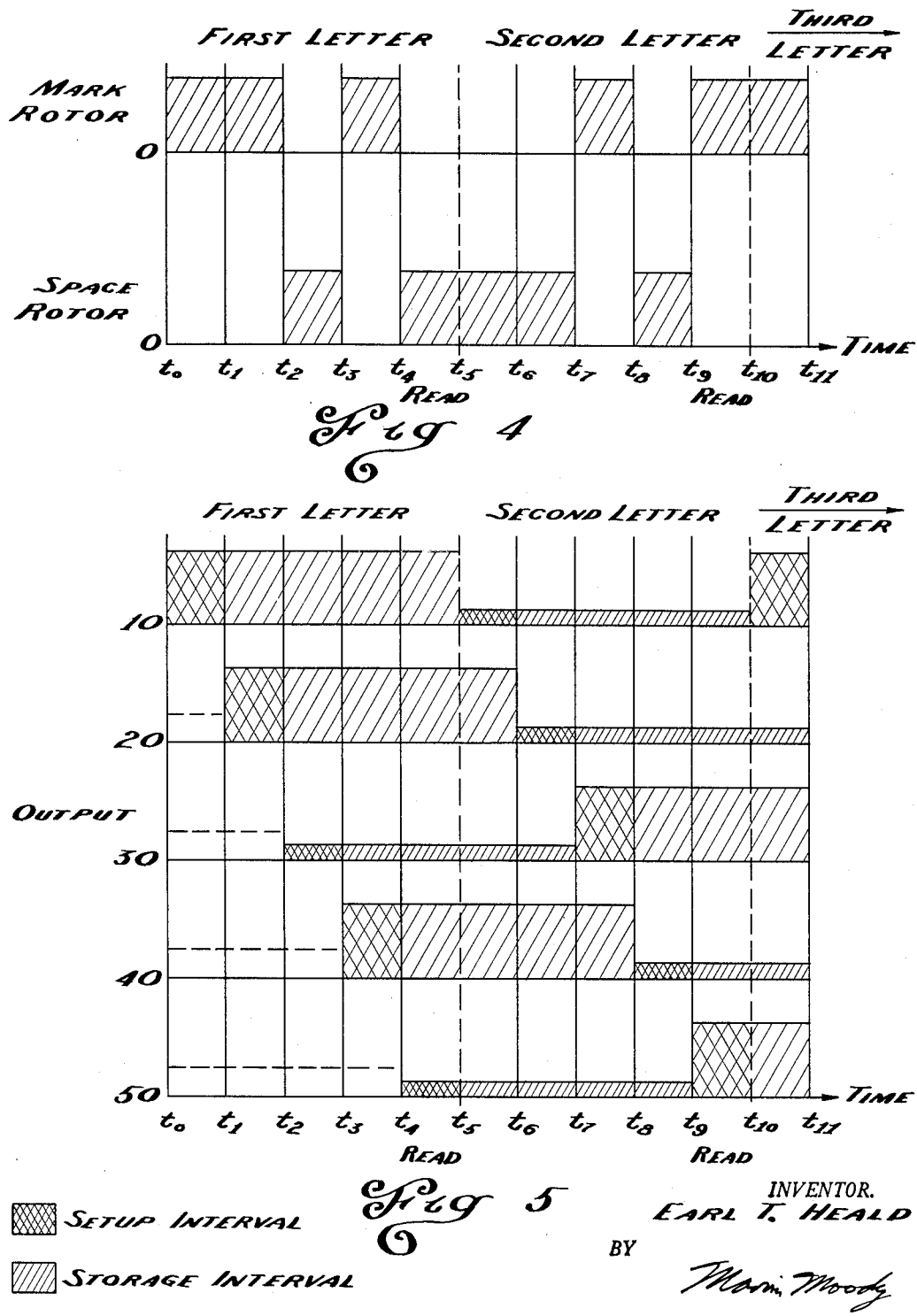

United States Patent Office 2,734,942
Patented Feb. 14, 1956

2,734,942

MAGNETIC COMMUTATOR

Earl T. Heald, Burbank, Calif., assignor to Collins Radio Company, Cedar Rapids, Iowa, a corporation of Iowa Application September 26, 1952, Serial No. 311,750

9 Claims. (Cl. 178—53)

This invention relates in general to a storing device, and in particular for changing pulses of a time sequential form to space sequential form.

In communications it is oftentimes more desirable to transmit a time sequential type of signal than it is a space sequential signal. In serial time sequence, if for example, a five pulse system is used to identify a single letter, the pulses are sent in a sequential fashion and the receiving means must remember the order of the five pulses to distinguish the letter being transmitted. This requires a memory device at the receiver. The present device receives serial time sequential information and converts it into space sequential form so that it may be simultaneously sampled to identify the letter being transmitted.

The present invention does not use sliding electrical contacts but accomplishes its function with a rotating magnetic commutator.

It is an object of this invention, therefore, to provide a remembering device wherein no slide contacts are used. Further objects, features and advantages of this invention will become apparent from the following description and claims when read in view of the drawings, in which:

Figure 4 illustrates a message sequence, and;

Figure 5 illustrates the outputs of the magnetic commutating device corresponding to the signal of Figure 4.

Figure 3:
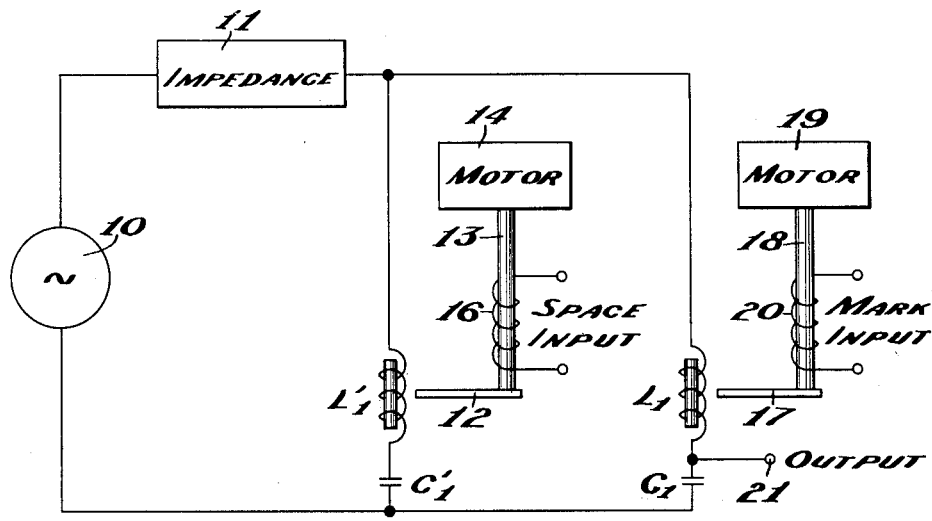
Figure 3 illustrates a ferro magnetic trigger circuit.

Figure 3 illustrates an alternating current generator 10 which is connected to an impedance 11. A pair of LC circuits are connected in parallel across the impedance 11 and generator 10, and comprise inductances $L_1$ and $L_1'$, and capacitances $C_1$ and $C_1'$. A first rotating magnet 12 of low retentivity is supported on a shaft 13 and is driven by a motor 14. A coil 16 is mounted about the shaft 13 and an input signal is connected to the coil 16 to control the polarity of the magnet 12.

A second magnet of low retentivity 17 is rotatably supported by the shaft 18 adjacent the inductance $L_1$ and is driven by a motor 19. A coil 20 supplies a magnetic input to the magnet 17. An output terminal 21 is connected to one side of the condenser $C_1$.

Figure 2:
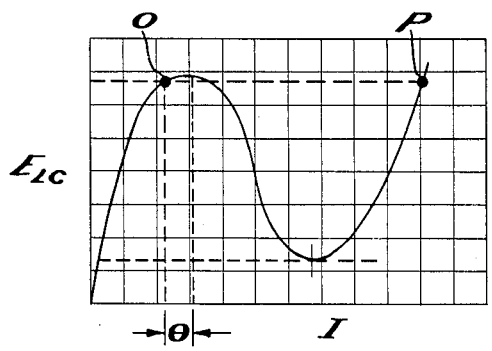
Figure 2 is a characteristic curve of a ferro-resonant series circuit.

The apparatus shown in Figure 3 constitutes a ferro-resonant trigger circuit. This circuit illustrates a bi-stable condition for the following reason: At times when no space or mark inputs are supplied to the coils 16 and 20, the values of $L_1'$ and $C_1'$ and the impedance 11 are chosen such that $L_1$, $C_1$, and $L_1'$ and $C_1'$ are not series resonant and thus the current through $C_1'$ and $C_1$ will be very small. However, when the magnets 12 and 17 produce aiding flux to the inductances $L_1$ or $L_1'$, a series resonant condition is obtained and a large current will flow through the respective legs. After the resonant condition has been established, the aiding magnetic flux from the magnets 12 and 17 may be removed and the high current will persist because the current maintains operation in the high current condition. The curve of Figure 2 illustrates this point. One stable condition is at point O with relatively small current, and the other is at P where a much greater current is obtained. It is to be noted that only the small amount of flux $\theta$ is necessary to cause the change from one condition to the other.

For a more detailed description of the principle of ferro-resonance produced by instability in a simple series LC circuit, reference may be made to Computers Research Corporation of Hawthorne, California, which manufactures trigger circuits with coils to trigger the circuits. See also pages 121–123 of the April 1952 issue of Electronics.

Figure 1:
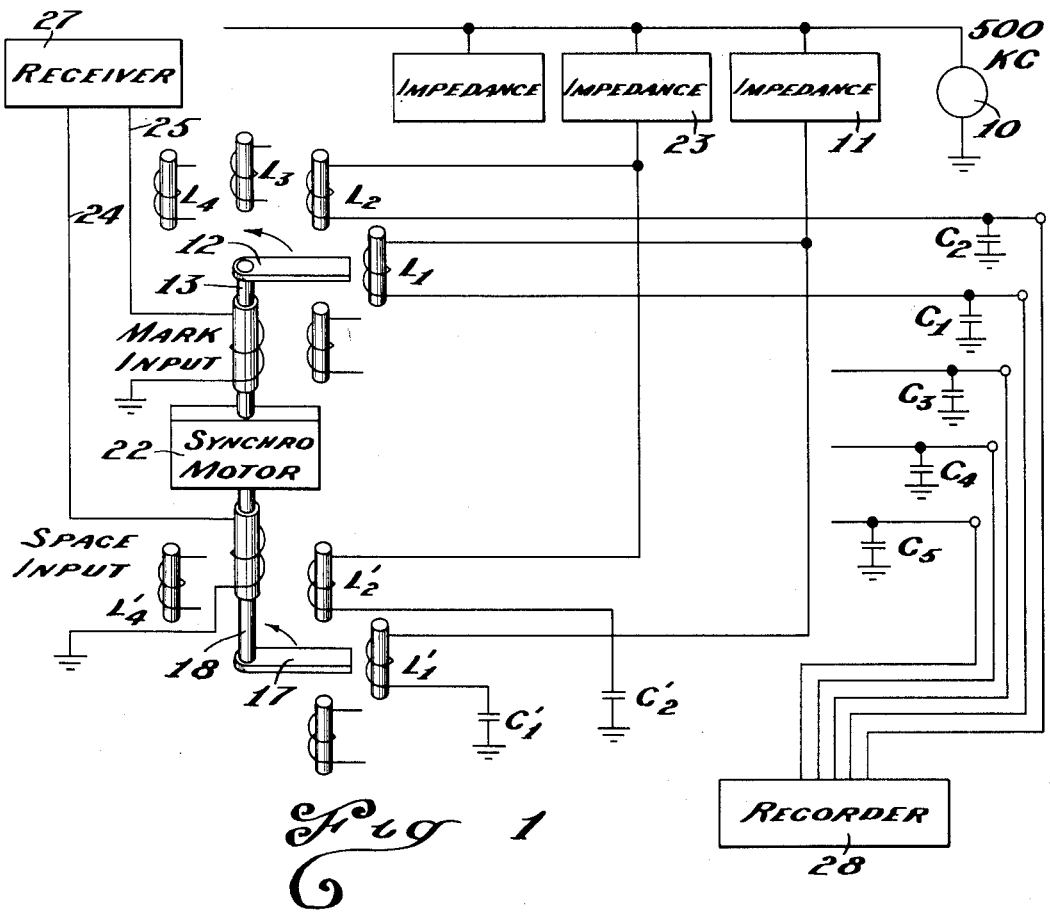
Figure 1 illustrates the magnetic commutator system of this invention.

Applicant proposes to utilize the apparatus of Figure 3 in the circuit of Figure 1. The shafts 13 and 18 are connected together and driven by the same motor 22. The magnets 12 and 17 rotate past a plurality of inductances mounted about their peripheries with each magnet simultaneously passing inductances $L_1$ and $L_1'$ corresponding to a single trigger circuit. It is to be noted that the generator 10 which might for example operate at 500 kilocycles, supplies current to the impedance 11 and inductances $L_1$ and $L_1'$ to operate the trigger circuits and maintain the high and low current conditions as established by the magnets 12 and 17.

A second trigger circuit comprises the impedance 23 which is connected to the inductances $L_2$ and $L_2'$ and which has an output terminal 24 connected across the capacitor $C_2$. It is to be realized, of course, that there is an impedance such as 11 and 23 for each of the pairs of inductors and a pair of condensers similar to $C_1$ and $C_1'$ and an output terminal. A recorded 28 is connected to the output terminals and records the settings of the various trigger circuits at a particular time.

The data is supplied to two leads 25 and 24 from a receiver 27 with one input for mark and one for space. These signals are applied to the coils on the rotors and cause a saturating flux to be applied to the proper one of the trigger circuits. Once the rotor have passed a given pair of coils and caused one of them to be saturated and thus resonant, the high current through this coil maintains the output in this position until the next succeeding passing of the rotors. The units thus act as signal storage elements permitting the output of many pairs of units to be sampled simultaneously and activate a coincidence type of gating.

For example, a five element binary code would require five pairs of coils. Assuming a high voltage at the output to indicate a mark and a low voltage to indicate a space, a letter designated as mark—mark—space—mark—space would be represented by the output across condenser $C_1$ being high, across condenser $C_2$ being high, across condenser $C_3$ being low, across condenser $C_4$ being high, and across condenser $C_5$ being low. Figure 4 illustrates the transmittal of two letters, the first one being mark—mark—space—mark—space and the second one being space—space—mark—space—mark. It is to be noted that the mark rotors and the space rotors produce exactly opposite outputs.

Figure 5 illustrates the output across the condensers $C_1$ through $C_5$ assuming that the rotor starts with condenser $C_1$. It is to be noted that during or between the interval $t_4$ and $t_5$ reading is done and the output is space — space — mark — space — space, reading downwardly. It is to be noted that once the particular trigger circuit has been actuated that it maintains its setting for five time intervals. Thus, the reading would occur between every fifth pulse and the information would be in space form rather than time sequential form.

Although this invention has been described with respect to particular embodiments thereof, it is not to be so limited as changes and modifications may be made therein which are within the full intended scope of the invention, as defined by the appended claims.

I claim:

1. A detecting means for a mark-space time sequential code comprising, a receiver receiving radiant energy and producing a pair of outputs corresponding, respectively, to mark and space, a driving means, an output shaft connected to said driving means, a first rotating magnet attached to said output shaft, a second rotating magnet connected to said output shaft, a first inductive coil mounted about said output shaft and inductively coupled to the first magnet and electrically connected to the mark output of said receiver, a second coil mounted about the shaft and inductively coupled to the second magnet and connected electrically to the space output of said receiver, a first plurality of inductors mounted about said first rotating magnet, a second plurality of inductors mounted about said second rotating magnet, one side of said first plurality of inductors connected, respectively, to one side of said second plurality of inductors, a plurality of impedances connected, respectively, to the common sides of said first and second plurality of inductors, an alternating current generator connected to the opposite sides of said impedances, a first plurality of condensers connected to the opposite sides of said first plurality of inductors, a second plurality of condensers connected to the second sides of said second plurality of inductors, and a recording means connected to said first plurality of condensers.

2. Means for detecting a pair of signals comprising, an alternating current generator, an impedance connected to one side of said alternating current generator, a first inductive means connected to the other side of said impedance, a first condenser connected between said generator and the first inductance, a second inductance connected to said impedance, a second condenser connected between said second inductance and said alternating current generator, a first driving means, a first output shaft connected to said first driving means, a first magnet attached to said first output shaft, a first inductive coupling coil mounted about said first output shaft and inductively coupled to said first magnet, a second driving means, a second output shaft connected to said second driving means, a second magnet attached to said second output shaft and rotated thereby, a second inductive coil coupled to said second output shaft and coupled to said second magnet, and an output terminal connected to said second condenser.

3. Magnetic commutating means comprising, a driving means, an output shaft connected to said driving means, a first and second magnet attached to said output shaft and driven thereby, a first plurality of inductive coils mounted about the periphery of rotation of the first magnet, a second plurality of inductive coils mounted about the periphery of rotation of the second magnet, a receiving means producing a pair of output signals, the first of said output signals inductively coupled to the first rotating magnet, the second of said inductive signals inductively coupled to the second rotating magnet, a first plurality of condensers connected, respectively, to said first plurality of inductors, a second plurality of condensers connected, respectively, to the second plurality of condensers, a common side of said first and second inductive coils connected together, a plurality of impedances connected, respectively, to the common connection of said first and second inductive coils, an alternating current generator connected to the opposite side of said impedances, and a recording means connected to said first plurality of condensers.

4. A commutating means comprising, a receiving means producing a pair of output signals, a driving means, an output shaft connected to the driving means, a pair of magnets attached to said output shaft and rotating therewith, the first output signal of said receiving means inductively coupled to said first magnet, the second output signal of said receiving means inductively coupled to the second magnet, a first plurality of inductive coils mounted about the periphery of rotation of said first magnet, a second plurality of inductive coils mounted about the periphery of rotation of the second magnet, one side of the first and second plurality of inductive coils connected together, a first plurality of condensers connected to the second side of said first plurality of inductive coils, a second plurality of condensers connected to the second side of said second plurality of inductive coils, a plurality of impedances connected, respectively, to the common connection of said first and second plurality of inductive coils, an alternating current generator connected to the opposite side of said plurality of impedances, and recording means connected to said first plurality of condensers.

5. Magnetic commutating means comprising, an alternating current generator, an impedance connected to one side of said generator, a first series inductive-capacitive circuit connected between one side of said impedance and the opposite side of said generator, a second series inductive-capacitance circuit connected between said impedance and the other side of said generator, a first driving means, a first output shaft connected to said first driving means, a first magnet of low retentivity attached to said first shaft and rotated therewith and inductively coupled to the inductive-capacitive circuit, a first inductive coil mounted about the first driving shaft and inductively coupled to said first magnet, a second driving means, a second output shaft connected to said second driving means, a second magnet attached to said second output shaft and driven thereby, said second magnet inductively coupled to said second inductive-capacitive circuit, a second inductive coil coupled to said second output shaft and inductively coupled to said second magnet, a pair of inputs connected, respectively, to the first and second inductive coils, and an output removed from one of said inductive-capacitive circuits.

6. A magnetic commutator comprising, a rotatably mounted magnet, energizing means for varying the flux emanating from said magnet, plural saturable core inductors mounted adjacent the rotative path of said magnet, each of said inductors constituting the inductive component of an associated bi-stable ferroresonant circuit and adapted when saturated to shift the operation of said circuit from a first condition to a second condition, and driving means for said magnet.

7. A data storage device comprising, plural parallel storage circuits connected across an alternating current source and an impedance in series, each of said storage circuits including a saturable core inductor and a capacitor in series, said device characterized by plural stable operating conditions, each condition represented by saturation of said core and relatively high current conduction in one of said storage circuits and relatively low current conduction in the others of said storage circuits, each of said conditions representing a different datum to be stored, and core saturating means for changing said device from one operating condition to another in accordance with the data to be stored, including a magnetic flux producing device movable selectively to inductive relation with each of said cores.

8. Apparatus for translating time sequential signals to space sequential signals including a plurality of space distributed inductors, each of which is included in an inductance-capacitance storage circuit, means including an alternating current source for maintaining each of said circuits in their stable operating conditions, each of said circuits having a first and second stable operating condition, a magnetic flux producing device energized in accordance with the said time sequential signals, driving means for moving said device to inductive relation with said inductors sequentially, the said device effective when energized and in inductive relation to one of said inductors to change the operation of the associated circuit from its first stable condition to its second stable condition, and means for restoring said circuit to its first condition.

9. A signal storage device comprising, a plurality of space distributed inductors having saturable cores, each of said inductors constituting the inductive component of a series inductance-capacitance circuit, means including an alternating current source, a series impedance and a shunt reactance for maintaining each of said inductance-capacitance circuits in their stable operating conditions, each of said circuits having a first and second stable operating condition, a magnetic flux producing device movable to inductive relation with said inductors sequentially, driving means for said device, means responsive to an incoming signal to energizing said device and produce flux when said device is in inductive relation with a selected one of said inductors, said flux being effective to influence said inductor to cause the circuit operation to shift from said first stable condition to said second stable condition, and means including said shunt reactance for restoring said circuit to its stable condition.

References Cited in the file of this patent

UNITED STATES PATENTS

| | | |
|---|---|---|
| 739,572 | Armstrong | Sept. 22, 1903 |
| 2,307,965 | Shepherd | Jan. 12, 1943 |
| 2,504,997 | Mason | Apr. 25, 1950 |
| 2,630,482 | Bostwick | Mar. 3, 1953 |
| 2,697,178 | Isborn | Dec. 14, 1954 |